(12) United States Patent
McLennan

(10) Patent No.: US 6,516,935 B1
(45) Date of Patent: Feb. 11, 2003

(54) SYSTEM FOR SELECTIVELY STORING AND REINTRODUCING PARTS INTO AN INDUSTRIAL ASSEMBLY LINE

(75) Inventor: Robert McLennan, Windsor (CA)

(73) Assignee: Valiant Machine & Tool Inc., Windsor (CA)

(*) Notice: Subject to any disclaimer, the term of this patent is extended or adjusted under 35 U.S.C. 154(b) by 44 days.

(21) Appl. No.: 09/975,046

(22) Filed: Oct. 11, 2001

(51) Int. Cl.[7] .............................................. B65G 37/00
(52) U.S. Cl. ............................... 198/347.3; 198/346.1; 198/346.2; 198/347.1
(58) Field of Search ............................. 198/358, 347.2, 198/347.4, 347.1, 346.1, 346.3, 346.2, 347.3

(56) References Cited

U.S. PATENT DOCUMENTS

| | | | | |
|---|---|---|---|---|
| 5,103,936 A | * | 4/1992 | Sticht | 198/465.1 |
| 5,186,304 A | * | 2/1993 | Kaczmarek et al. | 198/346.1 |
| 5,577,597 A | * | 11/1996 | Kakida et al. | 198/465.1 |
| 5,895,192 A | * | 4/1999 | Parnell, Sr. et al. | 414/225 |
| 6,073,746 A | * | 6/2000 | Oshiro | 198/345.1 |
| 6,106,221 A | * | 8/2000 | Manuszak et al. | 414/797.9 |
| 6,196,787 B1 | * | 3/2001 | Manuszak et al. | 414/801 |
| 6,305,728 B1 | * | 10/2001 | Holter et al. | 294/3 |
| 6,357,994 B1 | * | 3/2002 | St. Onge | 414/738 |
| 6,360,421 B1 | * | 3/2002 | Oatridge et al. | 29/469 |

* cited by examiner

Primary Examiner—Christopher P. Ellis
Assistant Examiner—Rashmi Sharma

(57) ABSTRACT

A system for temporarily storing and subsequently reintroducing parts into an industrial assembly line is disclosed having a first and second side-by-side conveyor, each having a first end. A robot manipulator is positioned adjacent both the assembly line and the first ends of the conveyors and the manipulator is configured to selectively engage and release the parts. The system includes a plurality of containers wherein each container is adapted to receive a plurality of parts within the container. A first alignment rail is positioned adjacent one corner of the first conveyor while a second alignment rail is positioned a corner of the second conveyor. An actuator is associated with each alignment rail so that, upon activation of the actuator to its extended position, the actuator engages a container at the first end of its associated conveyor and moves the container against the alignment rail thus positioning the container at a predetermined position relative to the conveyor. A controller selectively controls the actuation and direction of movement of both conveyors, the actuation of the robot manipulator as well as the activation of the actuators.

9 Claims, 4 Drawing Sheets

SYSTEM FOR SELECTIVELY STORING AND REINTRODUCING PARTS INTO AN INDUSTRIAL ASSEMBLY LINE

BACKGROUND OF THE INVENTION

I. Field of the Invention

The present invention relates generally to a system for selectively and temporarily storing parts from an industrial assembly line and then subsequently reintroducing the parts into the assembly line.

II. Description of the Prior Art

Modern industrial assembly lines typically contain a number of sequential stations along the assembly line. A work operation, assembly, machining operation or the like is typically performed at each station along the assembly line.

During a typical operation of the assembly line, one or more stations may be temporarily inoperable. For example, it may be necessary to replace the tooling at a particular station and during that changeover, the station is inoperable. Likewise, a malfunction or breakage at the assembly station may render the station inoperable for a period of time.

It is not economically practical to shut down the entire assembly line whenever a station becomes inoperable. Consequently, whenever a station becomes inoperable, it has been the previously known practice to manually temporarily store the parts on the assembly line upstream from the inoperable station until the station is again operable. When that occurs, the normal flow of parts along the assembly line through the workstation is reestablished. Thereafter, when the supply of parts to that particular workstation is interrupted for any reason, e.g. the temporary failure of an upstream workstation, the previously stored parts are then reintroduced into the station so that the normal flow of parts through the station, as well as downstream workstations, continues.

A primary disadvantage of this previously known method for maintaining the flow of parts along an industrial assembly line is that the manual temporary storage of parts and the subsequent manual reintroduction of those parts into the assembly line is necessarily labor intensive and, therefore, expensive.

SUMMARY OF THE PRESENT INVENTION

The present invention provides an automatic system that overcomes all of the above-mentioned disadvantages of the previously known methods.

In brief, the present invention comprises a first and second conveyor wherein each conveyor has both a first end and a second end. A robot manipulator is positioned adjacent to the assembly line and also adjacent the first ends of the conveyors. This robot manipulator, furthermore, is configured to selectively engage and release parts of the type conveyed by the assembly line.

The system of the present invention further comprises a plurality of containers wherein each container is adapted to receive a plurality of parts in predetermined positions within the container. Preferably, the containers are stackable to a predetermined height, e.g. five containers.

In order to accurately position the container relative to the conveyor, and thus relative to the robot manipulator, an alignment rail is provided along one corner at the first end of each conveyor. An actuator is then mounted cross corner from the container and movable between an extended and a retracted position. In its extended position, the actuator engages and moves the container against the alignment rail thus accurately positioning the container. Conversely, in its retracted position, the actuator is moved away from the container and allows the containers to be moved by the conveyors.

A controller selectively controls both the activation and direction of movement of both conveyors, as well as the operation of the robotic arm. The controller also controls the activation of the actuators.

In practice, the system is positioned upstream from a workstation along the assembly line which, in turn, is normally supplied parts from workstations upstream from the system. Assuming that the assembly line provides an uninterrupted flow of parts to the workstation and that the workstation is operable, the system of the present invention stands idle.

However, in the event that the workstation becomes temporarily inoperable, empty containers are conveyed to the first end of the second conveyor. The robotic arm then moves an empty container from the second conveyor and onto the first end of the first conveyor. The controller then actuates the actuator to position the empty container at a predetermined position at the first end of the first conveyor whereupon the robotic manipulator fills the container with parts supplied on the assembly line to the temporarily inoperable workstation.

Assuming that the workstation remains inoperable for an extended period of time, after the robotic actuator fills one container, it positions an empty container from the second conveyor on top of the filled container on the first conveyor and then fills that container. That process is repeated until the filled containers at the first end of the first conveyor are of a predetermined height, for example a stack of five filled containers. At that time, the controller actuates the first conveyor to move the filled containers to the second end of the first conveyor and simultaneously activates the second conveyor to move a new stack of empty containers to the first end of the second conveyor whereupon the above process is repeated. Furthermore, while the robot manipulator fills parts into the empty containers in the above-described fashion, the stack of filled containers is removed from the second end of the first conveyor by conventional means, such as a forklift truck, while, similarly, a stack of empty containers is positioned on the second end of the second conveyor.

The above process is repeated until the normal flow of parts through the workstation is reestablished. However, in the event of an interruption in the supply of parts to the workstation, the above process is simply reversed. More specifically, the robot manipulator removes parts from filled cartons at the first end of the first conveyor and reintroduces these parts into the assembly line. Once a container is empty, the robot manipulator moves the empty container from the first end of the first conveyor and to the first end of the second conveyor. A stack of filled containers is also positioned at the second end of the first conveyor.

After the robot manipulator has removed all of the parts from the stack of filled containers at the first end of the first conveyor and stacked the empty containers at the first end of the second conveyor, the controller actuates the conveyors to move a fresh supply of new filled containers from the second end and to the first end of the first conveyor and, simultaneously, to move the stack of empty containers from the first end of the second conveyor and to the second end of the second conveyor. The above process is then repeated.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
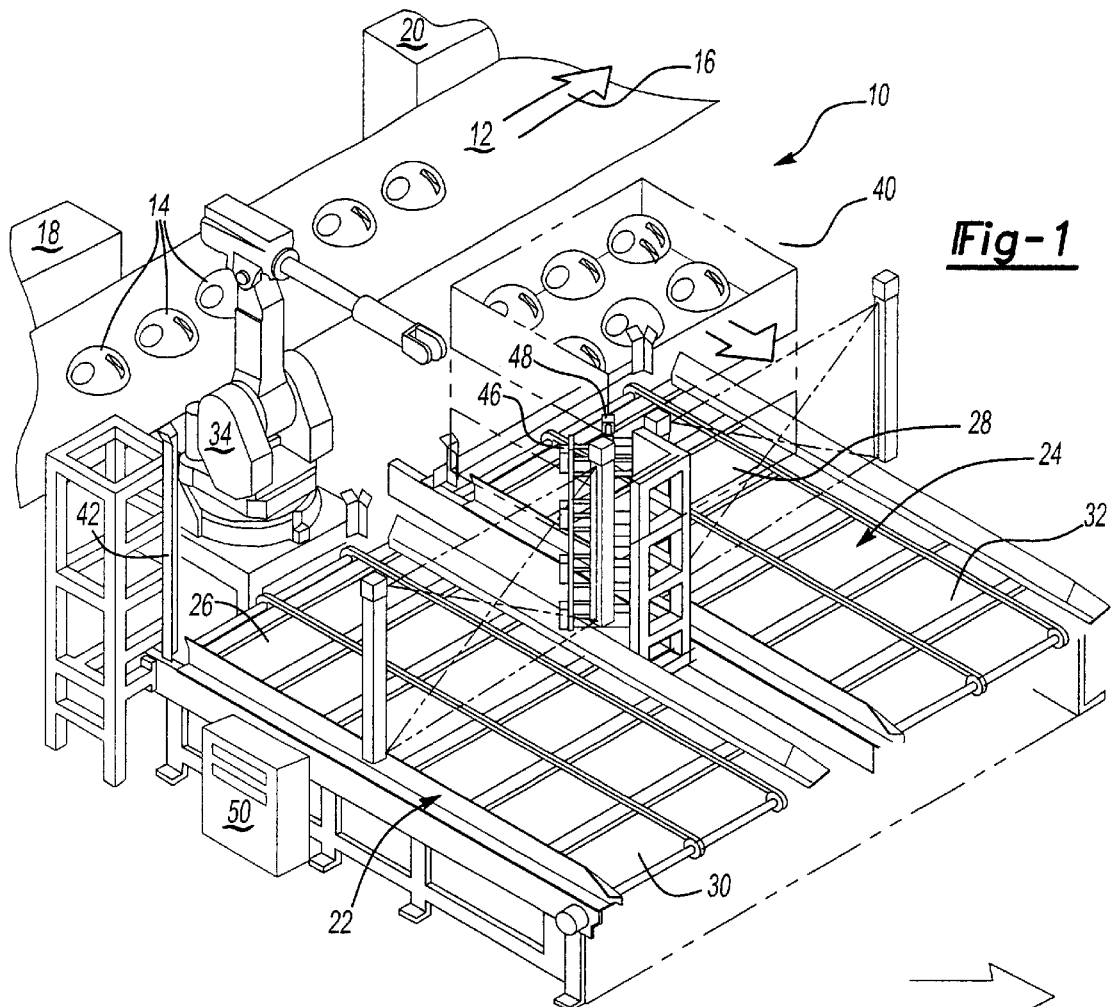
FIG. 1 is an elevational view illustrating a preferred embodiment of the present invention.

With reference first to FIG. 1, a preferred embodiment of the system 10 of the present invention is shown for use with an industrial assembly line 12 (illustrated only diagrammatically). The industrial assembly line 12, furthermore, moves a plurality of parts 14 in the direction of arrow 16 to sequential workstations 18 and 20 (illustrated only diagrammatically) along the assembly line 12.

Still referring to FIG. 1, the system 10 comprises a first conveyor 22 and a second conveyor 24 which are positioned side by side. Each conveyor 22 and 24 includes a first end 26 and 28 and a second end 30 and 32, respectively.

A robot manipulator 34 is positioned adjacent the first ends 26 and 28 of the conveyors 22 and 24 and also adjacent the assembly line 12. The robot manipulator 34, furthermore, is configured to selectively engage, move and thereafter release the parts 14 of the type conveyed by the assembly line 12.

Figure 3:
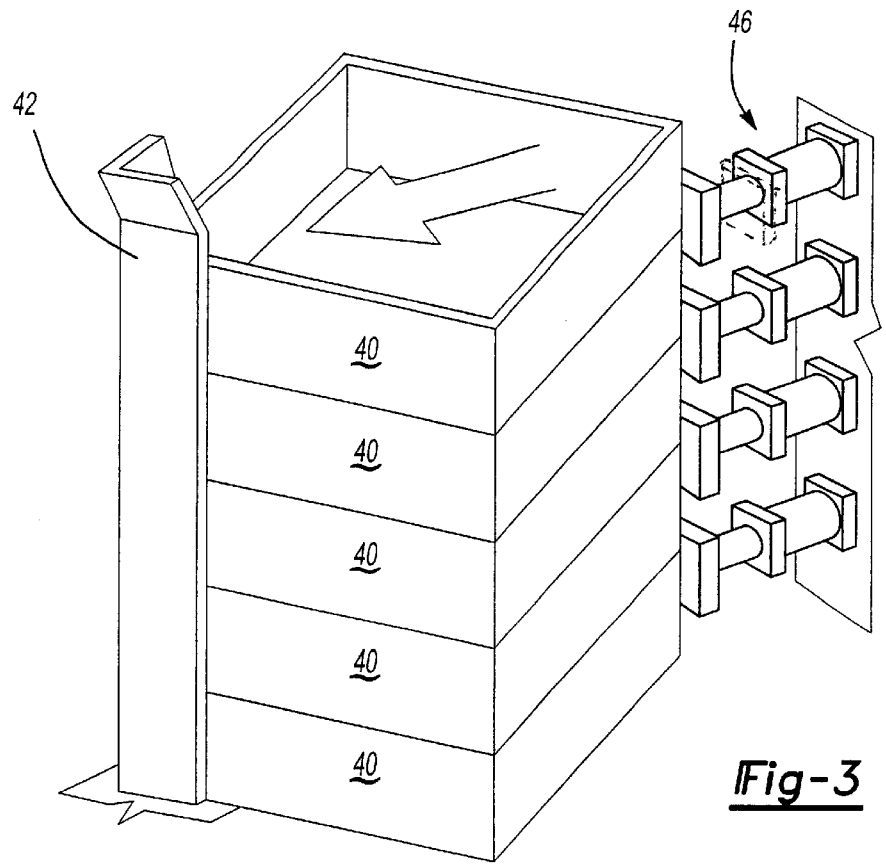
FIG. 3 is a side view illustrating a portion of the preferred embodiment of the present invention.

Referring to FIGS. 1 and 3, the system 10 includes a plurality of containers 40 each of which are adapted to receive a predetermined number of parts, e.g. six parts, at a predetermined position within the container 40. Furthermore, the containers 40 are preferably stackable to a predetermined height, e.g. five containers tall, as best shown in FIG. 3.

Figure 2:
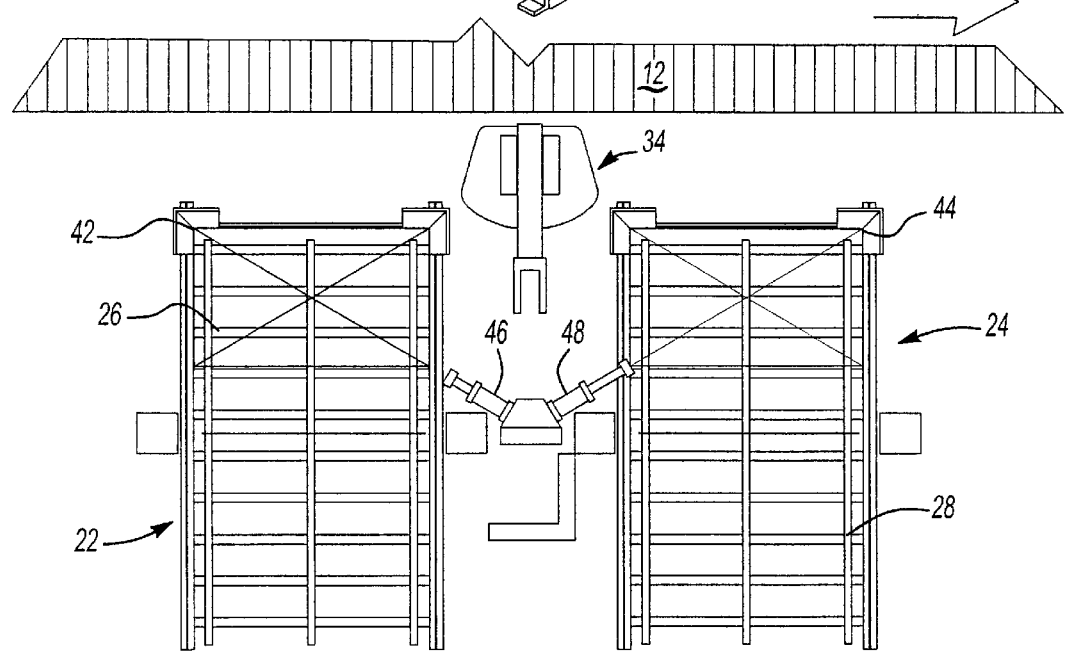
FIG. 2 is a top diagrammatic view illustrating the preferred embodiment of the present invention.

With reference now to FIGS. 2 and 3, an alignment rail 42 is positioned adjacent one corner at the first end 26 of the first conveyor 22. Similarly, a second alignment rail 44 (FIG. 2 only) is positioned adjacent one corner at the first end 28 of the second conveyor 24. A first actuator 46 is mounted to the conveyor 22 cross corner from the first alignment rail 42 while, similarly, a second actuator 48 is mounted cross corner from the second alignment rail 44 on the second conveyor 24.

The actuators 46 and 48 operate in an identical fashion so that only a description of the actuator 46 together with its alignment rail 42 is necessary, the same description being also applicable to the actuator 48 and its alignment rail 44. More specifically, as best shown in FIG. 3, the actuator 46 is movable between an extended position, illustrated in solid line in FIG. 3, and a retracted position, illustrated in phantom line in FIG. 3. In its extended position, the actuator 46 engages a container 40 positioned at the first end 26 of the first conveyor 22 and moves the container 40 against the alignment rail 42. In doing so, the actuator 46 precisely positions the container 40 relative to the conveyor 22 and thus relative to the robot manipulator 34. Thus, with the containers 40 positioned against the alignment rail 42, the robot manipulator 42 can accurately position the parts 14 either from the assembly line 12 and into the container 40 or, alternatively, remove the parts from the containers 40 and place them on the assembly line 12. Preferably, the actuators 46 are pneumatic actuators.

With reference again to FIG. 1, a controller 50, such as a PLC controller, is operatively connected to both conveyors 22 and 24 as well as the actuators 46 and 48 and the robot manipulator 34. The controller 50 thus controls both the actuation as well as direction of movement of the conveyors 22 and 24 as well as the activation of the actuators 46 and 48 and the movement of the robot manipulator 34. The controller 50 itself, however, is conventional in construction so that a further description thereof is unnecessary.

With reference now to FIGS. 4–7, the operation of the system will now be described. Assuming that the flow of parts from the workstation 18 and to the workstation 20 is uninterrupted and that the workstation 20 is also operable, the entire system 10 of the present invention remains idle. During an idle condition, the parts 14 are merely conveyed by the assembly line in the conventional fashion without interaction with the system 10 of the present invention.

Figure 4:
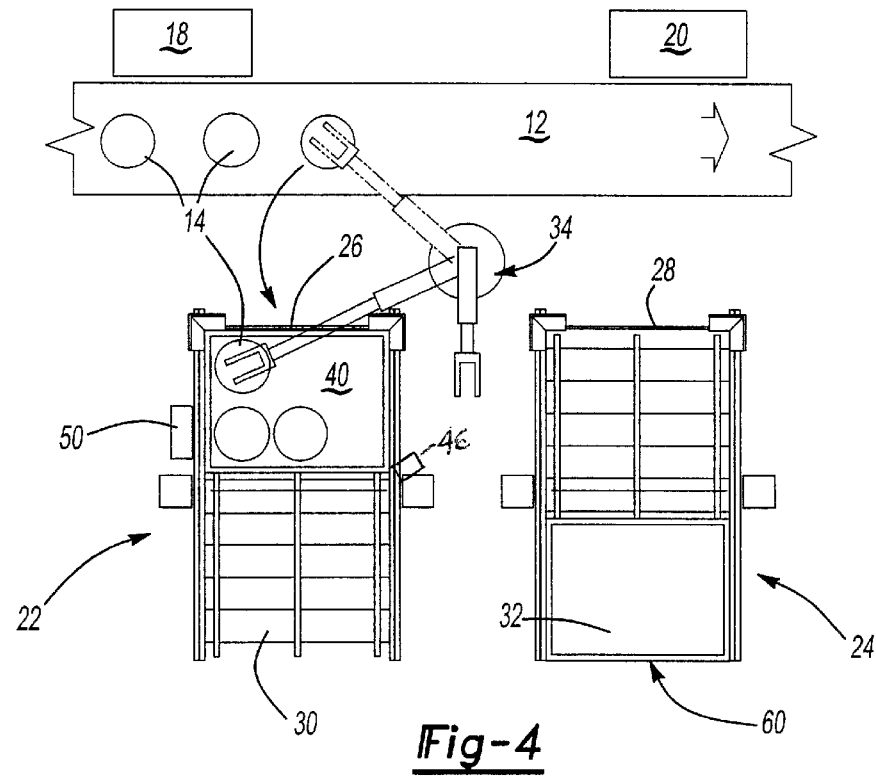
FIGS. 4–7 are diagrammatic views illustrating the operation of the present invention.

With reference now to FIG. 4, assume that the workstation 20 becomes temporarily inoperative so that it is desirable to temporarily store the parts 14 received from the upstream workstation 18 in the containers 40. In this event, a stack of empty containers is moved from the second end 32 and to the first end 28 of the second conveyor 24. The robot manipulator 34 is then activated by the controller 50 to lift the topmost empty container 40 from the second conveyor 24 and place it at the first end 26 of the first conveyor 22. The actuator 46 is then actuated to position the container 40 against its alignment rail 42 and thus accurately position the empty container 40 relative to the robot manipulator 34.

The robot manipulator 34 then removes the parts 14 from the assembly line 12 and places the parts at predetermined positions within the empty container 40. A stack 60 of empty containers is also positioned at the second end 32 of the second conveyor 24. When the empty container 40 is completely filled, the robot manipulator selects the top empty container 40 from the second conveyor 24, places the empty container on top of the now filled container on the conveyor 22, and the above-identified process is repeated until all of the containers are removed from the second conveyor 24 and filled with parts on the first conveyor 22.

Figure 5:
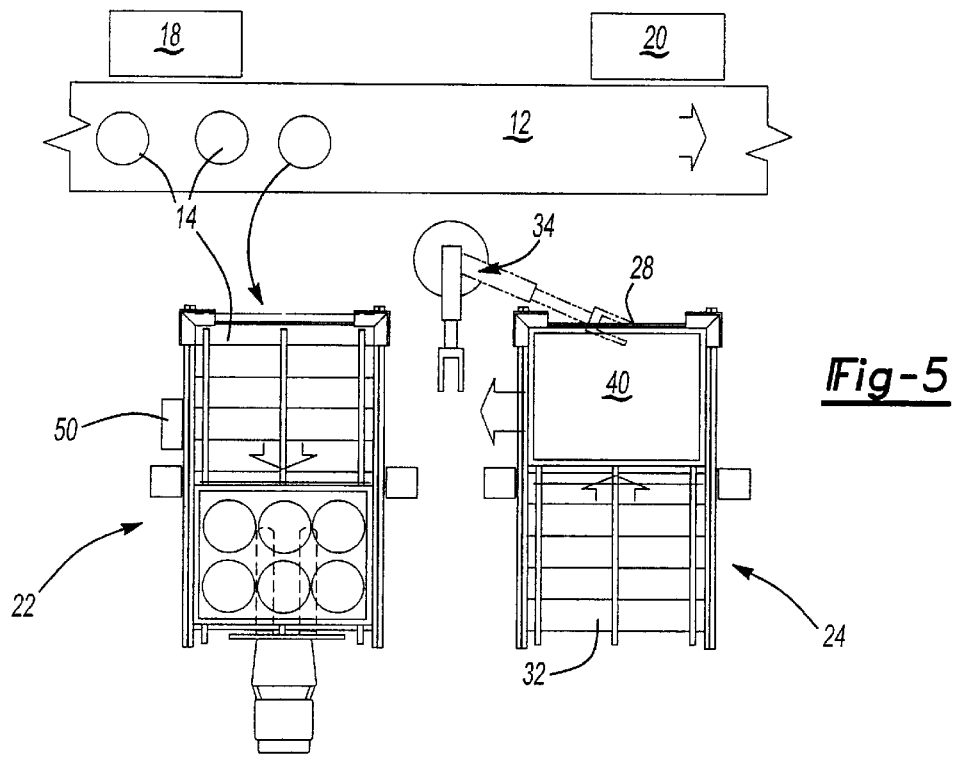

With reference now to FIG. 5, at that time, the controller 50 activates the conveyors 22 and 24 to move the filled stack 58 of parts from the first end 26 of the first conveyor 22 and to the second end 30. Simultaneously, the controller 50 activates the second conveyor 24 to move the stack 60 of empty containers 40 from the second end of the second conveyor 24 and to its first end 28. The system then moves the empty containers from the second conveyor 24 onto the first conveyor 22 and fills these containers 40 in the previously described fashion. During that time, the stack 58 of the now filled containers is removed from the second end 30 of the first conveyor 22 by conventional means, such as a hi-lo truck. Likewise, a stack 60 of empty containers is positioned on the second end 32 of the second conveyor 24.

The above process is continued until the operation of the second workstation 20 is restored. At that time, the system again remains idle thus permitting the normal flow of parts 14 from the workstation 18 and to the workstation 20.

Figure 6:
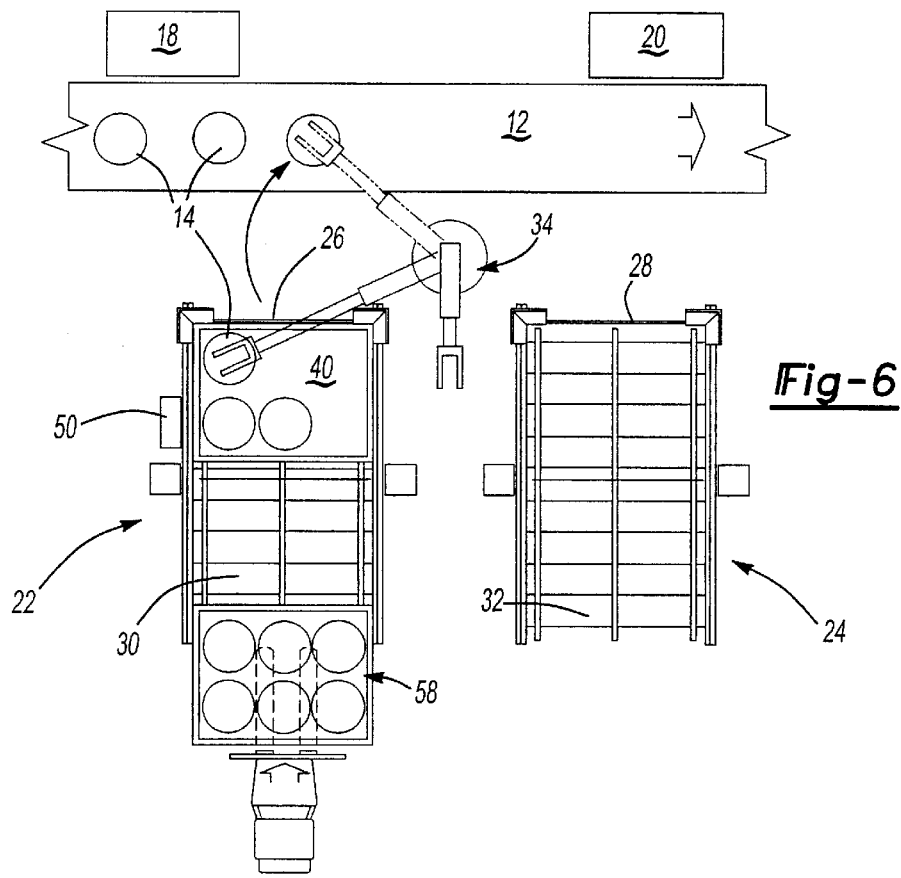

With reference now to FIG. 6, in the event that the flow of parts to the workstation 20 from the workstation 18 is interrupted, the controller 50 then reverses the operation thus far described.

More specifically, in the event of an interruption of work parts to the workstation 20, the robot manipulator 34 removes parts from the filled containers 40 at the first end of the first conveyor 22. When all of the parts 14 are removed from a container 40, the robot manipulator 40 moves the now empty container from the first conveyor 22 and to the first end 28 of the second conveyor 24. As before, the actuators 46 and 48 accurately position the containers 40, filled or empty, on the conveyors 22 and 24.

Still referring to FIG. 6, while the robot manipulator 34 removes parts from the containers 40 on the first conveyor 22, one stack 58 of containers filled with parts is placed on the second end 30 of the first conveyor 22. Any stack 60 of empty containers at the second end 32 of the second conveyor 24 is also removed during this time.

Figure 7:
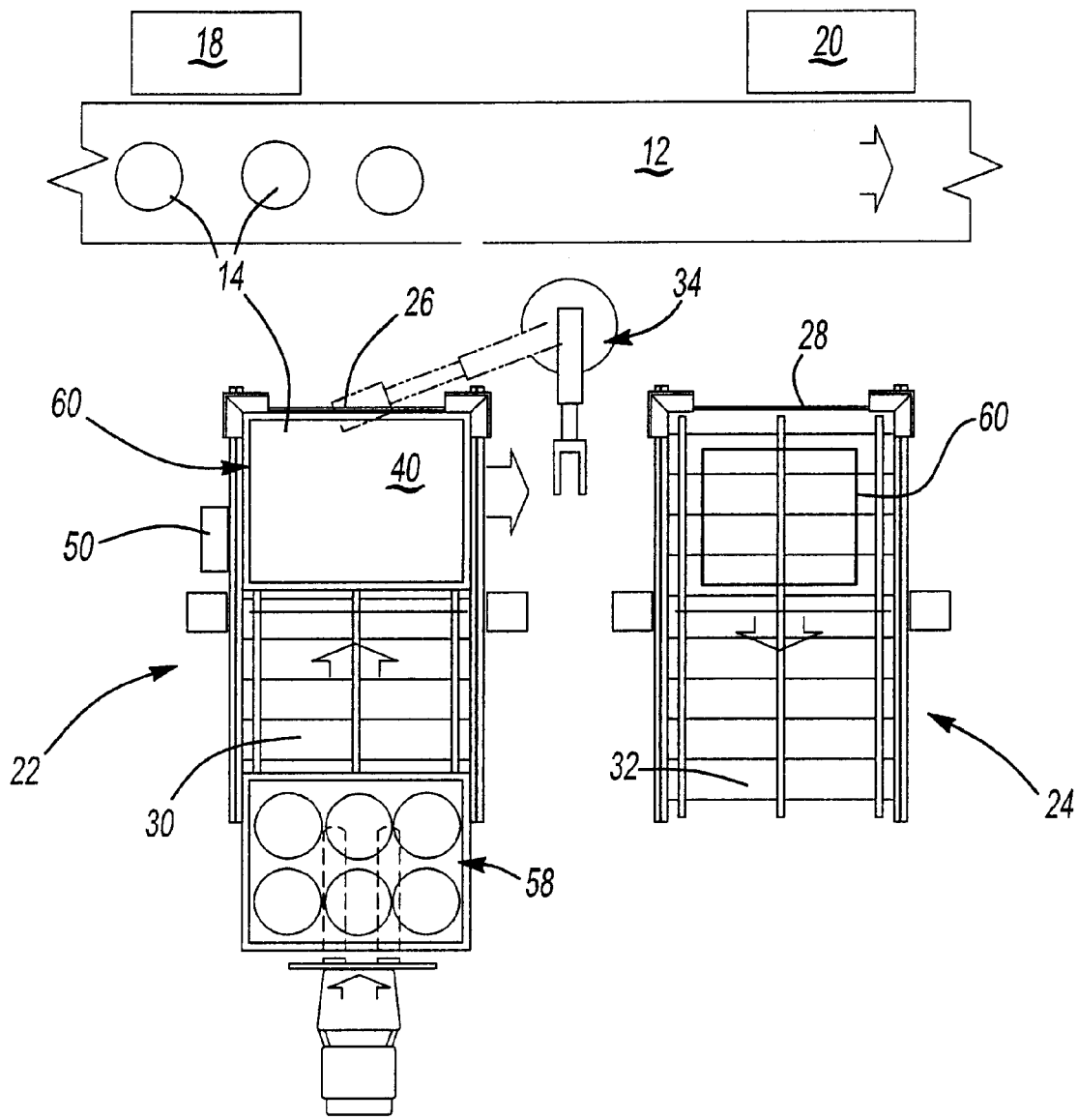

With reference now to FIG. 7, after all of the parts have been removed from the containers 40 positioned at the first end 26 of the first conveyor 22 and the empty containers positioned in the stack 60 at the first end 28 of the second conveyor 24, the controller 50 activates both conveyors 22 and 24 to both move the stack 58 of filled containers 40 from the second end 30 of the first conveyor and to the first end 26 of the first conveyor and move the stack 60 of empty containers from the first end 28 of the second conveyor 24 and to its second end 32. The stack 60 of empty containers is then removed by conventional means, such as a hi-lo truck, from the second end 32 of the second conveyor 26 while, likewise, a stack of filled containers is positioned on the second end 30 of the first conveyor 22. This process is repeated until normal operation of the assembly line 12 resumes.

From the foregoing, it can be seen that the present invention provides an automatic system for temporarily storing and then reintroducing parts from an assembly line as workstations both upstream and downstream from the system become temporarily disabled. Having described my invention, however, many modifications thereto will become apparent to those skilled in the art to which it pertains without deviation from the spirit of the invention as defined by the scope of the appended claims.

I claim:

1. A system for temporarily storing and subsequently reintroducing parts into an industrial assembly line comprising:

a first conveyor and a second conveyor, each conveyor having first end and a second end, a robot manipulator positioned adjacent the assembly line and adjacent said first ends of said conveyors, said robot manipulator being configured to selectively engage and release parts, a plurality of containers, each container adapted to receive a plurality of the parts in predetermined positions within the container, a first and second alignment rail, said first alignment rail positioned adjacent the first end of said first conveyor and said second alignment rail positioned adjacent the first end of said second conveyor, a first actuator movable between and extended position in which said actuator engages one container at said first end of said first conveyor and moves said one container against said first alignment rail, and a retracted position, a second actuator movable between and extended position in which said actuator engages one container at said first end of said second conveyor and moves said one container against said second alignment rail, and a retracted position, a controller which controls the activation and direction of movement of said conveyors, the activation of said actuators and said robot manipulator to selectively move parts between the assembly line and containers on said first conveyor and selectively move empty containers between said first conveyor and said second conveyor.

2. The invention as defined in claim 1 wherein said controller further selectively controls said robot manipulator to move empty containers from the first end of one conveyor to the first end of the other conveyor.

3. The invention as defined in claim 1 wherein said controller further selectively controls said robot manipulator to move empty containers from the first end of one conveyor and onto a filled container at the first end of the other conveyor.

4. The invention as defined in claim 1 wherein said alignment rails are positioned adjacent a corner at said first end of their respective conveyors, and wherein said actuators are positioned cross corner from their respective alignment rails.

5. The invention as defined in claim 4 wherein each actuator moves along an axis aligned with its associated alignment rail.

6. The invention as defined in claim 4 wherein said actuators are pneumatic actuators.

7. The invention as defined in claim 1 wherein said second conveyor has a length at least twice the length of said containers so that, upon actuation of said second conveyor, at least one empty container is moved between said second end and said first end of said second conveyor.

8. The invention as defined in claim 1 wherein said first conveyor has a length at least twice the length of said containers so that, upon actuation of said first conveyor, at least one filled container is moved between said first end and said second end of said first conveyor.

9. The invention as defined in claim 1 wherein said conveyors are positioned side by side.

* * * * *